United States Patent [19]

Dalrymple et al.

[11] Patent Number: 4,951,230

[45] Date of Patent: Aug. 21, 1990

[54] METHOD AND APPARATUS FOR TILING AN IMAGE

[75] Inventors: John C. Dalrymple, Portland; Suresh V. B. Kumar; Peter B. Parkinson, both of Lake Oswego, all of Oreg.

[73] Assignee: Tektronix, Inc., Beaverton, Oreg.

[21] Appl. No.: 403,059

[22] Filed: Sep. 5, 1989

Related U.S. Application Data

[63] Continuation of Ser. No. 113,031, Oct. 26, 1987, abandoned.

[51] Int. Cl.$^5$ .................... G06F 15/20; G06F 15/66
[52] U.S. Cl. ................................ 364/521; 340/721; 340/799; 364/518
[58] Field of Search ............. 364/518, 519, 520, 521, 364/522; 340/721, 729, 750, 798–800; 365/230.01, 230.03, 230.08, 238

[56] References Cited

U.S. PATENT DOCUMENTS

| | | | |
|---|---|---|---|
| 4,580,236 | 4/1986 | Tsujioka et al. | 364/521 X |
| 4,628,489 | 12/1986 | Ong et al. | 365/230 |
| 4,654,804 | 3/1987 | Thaden et al. | 364/520 |
| 4,701,864 | 10/1987 | Takashima et al. | 364/521 |
| 4,725,831 | 2/1988 | Coleman | 340/747 |
| 4,773,044 | 9/1988 | Sfarti et al. | 364/518 X |
| 4,821,212 | 4/1989 | Heartz | 364/522 X |

Primary Examiner—Gary V. Harkcom
Assistant Examiner—H. R. Herndon
Attorney, Agent, or Firm—John Smith-Hill

[57] ABSTRACT

A memory device having a plurality of addressable memory locations, each of which can be defined uniquely by an address having an X component and a Y component. The locations correspond respectively to grid points in a rectangular array at a pitch dX in the X direction and a pitch dY in the Y direction is loaded with data values at locations corresponding to grid points lying substantially on a line from a location $(X_0+e*dX, Y_0+f*dY)$ to a location $(X_0+p*dX, Y_0+q*dY)$, where $X_0, Y_0$ is a grid point and e, f, p, and q are integers. The memory device is loaded by a method which includes (a) setting $s = \text{floor}(p/q)$ $$
\begin{aligned}
\text{PInc} &= -sq - q \\
\text{NInc} &= p - sq - q \\
\text{AErr}_0 &= \text{PInc}
\end{aligned}
$$

(b) for each value of i in the range from 0 to q−1, executing $$
\begin{aligned}
&\text{If AErr}_i \geq 0 \\
&\text{then } X_{i+1} = X_i + (s+1)dX \\
&\quad \text{AErr}_{i+1} = \text{AErr}_i + \text{PInc} \\
&\text{else } X_{i+1} = X_i + sdX \\
&\quad \text{AErr}_{i+1} = \text{AErr}_i + \text{NInc} \\
&\text{end If} \\
&Y_{i+1} = Y_i + dY
\end{aligned}
$$

and (c) loading the memory locations $(X_{i+1}+u*dX, Y_{i+1})$, where u is an integer, for each value of i in the range from 0 to q−1.

12 Claims, 3 Drawing Sheets

METHOD AND APPARATUS FOR TILING AN IMAGE

This is a continuation of application of Ser. No. 07/113,031 filed Oct. 26, 1987 and now abandoned.

BACKGROUND OF THE INVENTION

This invention relates to a method and apparatus for tiling an image.

In a computer graphics system, an image is displayed on the screen of a cathode-ray-tube (CRT) or other display device Generally, the electron beam of the CRT is deflected under control of a digital signal having an X (horizontal) component and a Y (vertical) component, so that pixels on a rectangular array of grid points are addressed row-by-row in accordance with a raster pattern. Data representing the image is generated in a processor and is down-loaded from the processor to a frame buffer. The frame buffer has memory locations which correspond on a one-to-one basis with the grid points of the CRT display In the following description, it will be assumed for the sake of clarity that the memory locations of the frame buffer are physically arranged in a rectangular array which corresponds to the array of grid points of the display The digital signal that is used to control deflection of the CRT's electron beam is also used to control addressing of the frame buffer, and the color with which the pixel at a grid point is displayed depends on the contents of the corresponding memory location. The frame buffer thus contains a virtual image of the display that is provided by the CRT. The data provided to the frame buffer by the processor may represent an image composed of colored areas. The process of loading data values into the frame buffer memory to represent a colored area is called tiling. In the following description, references are made in connection with a tiling operation to the tiling of specified grid points and to the tiling of polygons. However, this is intended merely as an abbreviated way of referring to the tiling of the memory locations corresponding to the specified grid points and to the tiling of the memory locations corresponding to the grid points that lie within the polygons.

A computer graphics system may be used to depict a three-dimensional object having polygonal surfaces by projection of those surfaces into a two-dimensional display plane. Each polygonal surface forms a polygon or a line when projected into the display plane. Information defining the polygonal surfaces in threedimensional space is specified to the processor, which utilizes that information to generate information defining the corresponding display plane polygons. This information is made available by the processor to a tiling engine. For each polygon in turn, the tiling engine determines which grid points lie inside the polygon. It is very time consuming to examine each grid point and determine whether it lies inside the polygon. A convex polygon may be tiled more rapidly by determining, for each row of grid points, the two locations at which that row intersects the boundary of the polygon and tiling the grid points between these locations. For example, the polygon shown in FIG. 1 may be tiled from the lowest row of grid points upwards by determining which points lie between the two edges that extend upwards from the lowest row, and tiling the corresponding memory locations. The X coordinates of the intersections of the edge AB with the grid rows 1-4 can be identified by iteratively adding the slope of the edge AB to the X coordinate of the start point A. (Since the independent variable is plotted in the Y direction, the slope of the edge AB is not $(Y_B - Y_A)/X_B - X_A)$ but $(X_B - X_A)/(Y_B - Y_A)$). Similarly, the X coordinates of the intersections of the line AD with the grid rows 1-8 can be identified by iteratively adding the slope of the edge AD to the X coordinate of the start point A. On each of the rows 1-4, the grid points that lie between the two intersections of the grid row with the lines AB and AD respectively are tiled. However, the coordinates of the points A and D are (8,0) and (12,8) and therefore the slope of the edge AD is not an integer and intersections of the edge AD with the grid rows 1, 2, 3, etc. are at $8\frac{1}{2}$, 9, $9\frac{1}{2}$, 10, etc., and when determining which points to tile on alternate rows it is necessary to round the fractions up (or down) nevertheless, the eight iterations needed to reach row 8 would yield an X coordinate of 12.

Figure 1:
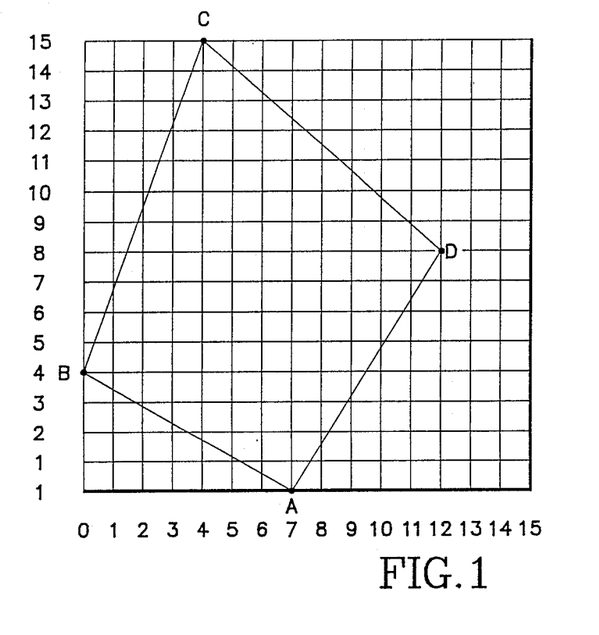
FIG. 1 illustrates a rectangular array of grid points and a quadrilateral having its vertices at grid points.

The slope of an edge between two grid points cannot always be expressed as the sum of an integer (which may be zero) and a binary fraction. The slope of the edge BC is 4/11. If 4/11 is iteratively added to the X coordinate of the start point B, the values 4/11, 8/11, 1 1/11, etc. are returned. However, since the fraction 4/11 cannot be expressed accurately as a binary fraction, it is necessary to perform a division and truncation before carrying out the additions. If, for example, the fraction 4/11 were approximated by $\frac{3}{8}$, the eleven additions required to reach the row 15 from row 4 would return $4\frac{1}{8}$. The coordinates $(4\frac{1}{8},15)$ would be approximated by (4,15), so that no error would result. However, in some cases it may be necessary to carry out a hundred or more additions, in which case an error might result such that the end point that is reached by iterative addition of the slope of the edge is spaced by several grid points from the desired grid point. Accordingly, the displayed image would be inaccurate.

SUMMARY OF THE INVENTION

The potential error in iteratively adding the slope of an edge to the X coordinate of a start point in order to reach an end point can be eliminated if the quantity that is added to the X coordinate of the start point is not a constant, such as the slope of the edge, but varies on successive iterations to take account of errors that have been introduced on previous iterations.

J. E. Bresenham, "Algorithm for Computer Control of a Digital Plotter," IBM Systems Journal, Vol. 4, 25 (1965), describes an algorithm that enables a plotter that is capable of applying print medium to equally-spaced locations along first and second mutually perpendicular axes to select a path of movement for the print head of the plotter that provides a good simulation of a straight line between a start point and an end point. The actual end point is the same as the desired end point. The algorithm described by Bresenham is subject to disadvantage, in that it is limited to the case in which the line to be simulated is in the first octant of a Cartesian coordinate system. In order to simulate a line that lies in one of the other octants, it is necessary to change signs and/or In U.S. patent application Ser. No. 07/079,622 filed July 30, 1987, the disclosure of which is hereby incorporated by reference herein, there is described a modification of Bresenham's algorithm such that it is not necessary to change signs and/or exchange axes in order to simulate a line in an octant other than the first.

A preferred embodiment of the present invention method of loading a memory device having a rectangular array of addressable memory locations, each of which can be defined uniquely by an address having an X component and a Y component, which locations correspond respectively to grid points in a rectangular array at a pitch dX in the X direction and dY in the Y direction, wherein it is desired to load memory locations corresponding to substantially all grid points between a straight line from a point $(XM_0, Y_0)$ to a point $(XM_0+pM*dX, Y_0+q*dY)$ and a straight line from a point $(Xm_0, Y_0)$ to a point $(Xm_0+pm*dx, Y_0q*dY)$ where pM, pm, and q are integers. The method comprises:
(a) setting sM=floor(pM/q)

```
PIncM = pM − sMq − q
NIncM = pM − sMq
AErrM₀ = PIncM
sm = floor (pm/q)
PIncm = pm − smq − q
NIncm = pm − smq
AEerrm₀ = PIncm
```

(b) for each value of i in the range from 0 to q−1, executing

```
If AErrM_i >= 0
then XM_{i+1}: = XM_i + sM + 1
AErrM_{i+1}: = AErrM_i + PIncM
else XM_{i+1}: = XM_i + sM
AErrM_{i+1}: = AErrM_i + NIncM
end If
``` and concurrently executing

```
If AErrm_i >= 0
then Xm_{i+1}: = Xm_i + sm + 1
AErrm_{i+1}: = AErrm_i + PIncm
else Xm_{i+1}: = Xm_i + sm
AErrm_{i+1}: = AErrm_i + NIncm
end If
```

(c) incrementing i and storing the difference $Hrz_{i+1}$ between $XM_{i+1}$ and $Xm_{i+1}$, and (d) loading the memory locations for the (i+1)th row starting with the location $(XM_{i+1}, Y_{i+1})$ and successively loading $(Hrz_{i+1})$ adjacent memory locations.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 2:
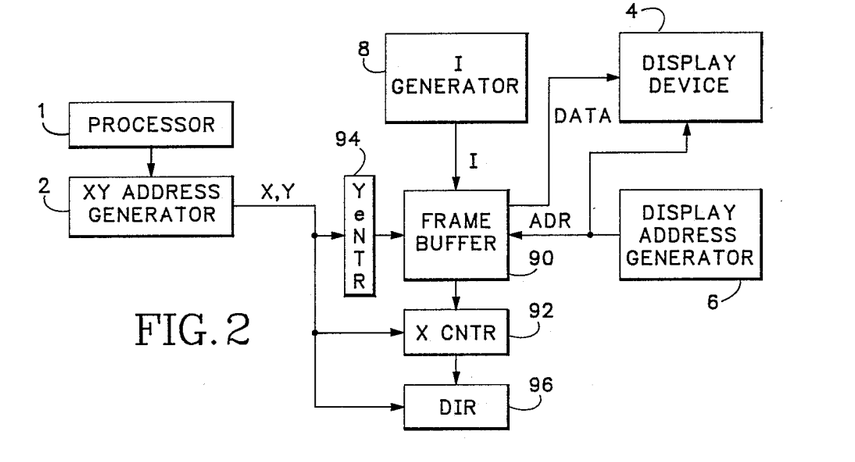
FIG. 2 is a simplified block diagram of a computer graphics system.
Figure 4:
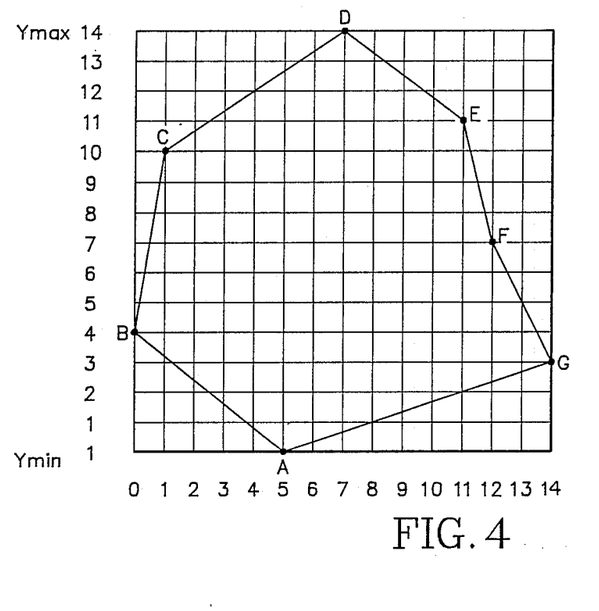
FIG. 4 illustrates a rectangular array of grid points and a general polygon having its vertices at grid points.

The computer graphics system illustrated in FIG. 2 comprises a processor 1 which receives a display list and generates information representing polygons and applies information defining these polygons sequentially to an XY address generator 2. The computer graphics system further comprises a display device 4 and a display address generator 6. The display address generator generates a display address signal having an X (horizontal) component and a Y (vertical) component such that pixels on a rectangular array of grid points of the display device are addressed row by row in accordance with a raster pattern. The XY address generator 2 enables tiling of a general polygon whose vertices lie at grid points of a rectangular grid, the polygon having two opposite sidings which extend between a minimum ordinate value $Y_{min}$ and a maximum ordinate value $Y_{max}$, and the value of Y along each siding being monotonically non-decreasing. Such a polygon, having sidings ABCD and AGFED, is shown in FIG. 4. In the case of the polygon shown in FIG. 4, the value of $Y_{min}$ is indicated arbitrarily as being zero. Since the value of Y along each siding is monotonically non-decreasing, each siding intersects each grid row between $Y_{min}$ and $Y_{max}$ only once. Accordingly, each grid row has only two active edges.

The grid points inside the polygon are to be tiled row by row, from below upwards. A row may be tiled either from left to right or from right to left. One of the sidings is selected as the "major" siding. During tiling of the polygon, tiling proceeds from the major siding to the opposite, "minor" siding. The major siding is selected to be the siding that is composed of fewer edges. In the case of FIG. 4, therefore, the siding ABCD is selected as the major siding. If each siding has the same number of edges, one of the sidings, e.g., the left siding, is selected arbitrarily as the major siding.

A frame buffer 9 comprises a memory 90 having a rectangular array of memory locations, an X address counter 92, a Y address counter 94 and a one bit storage element 96. When the memory 90 has been loaded, the display address generator reads the contents of the memory and employs the contents of the memory to pixellate the display device. The XY address generator 2 and the frame buffer 9 communicate over a local display bus to facilitate illustration of the graphics system in FIG. 2, the local display bus is not shown; rather, separate connections between the XY address generator and the frame buffer are shown in FIG. 2.

The local display bus is a 32 bit multiplexed address/data bus. During an address cycle, the top four bits (31–28) specify the block that is to receive the next data cycle, the next bit (27) is a hesitate bit, bits 26–24 specify the octant in which the current vector lies, and thus indicate coarsely the direction of the current vector, bits 23–12 are a Y address, and bits 11–0 are an X address. In a tiling operation, only two directions are possible and bits 25 and 24 are not changed when the direction of tiling changes. Therefore, bit 26 determines whether tiling takes place from right to left (bit 26 set) or from left to right (bit 26 not set). Whether the information on the bus is interpreted as an address or as data depends on the state of control lines.

For each grid row of a polygon to be tiled, the XY address generator generates address words representing the coordinates (X, Y) of one grid point on that row of the polygon. These address words are applied to the frame buffer 9 and are stored in the X address counter 92 and the Y address counter 94. The storage element 96 receives the direction bit (bit 26).

In order to tile a polygon, the XY address generator 2 is first placed in an initialization state and is then placed in an operating state, in which operation is under control of a state machine 12 (shown in FIG. 3 but not in FIG. 2), which steps sequentially through predetermined states in successive clock cycles defined by a master clock 14.

Figure 3:
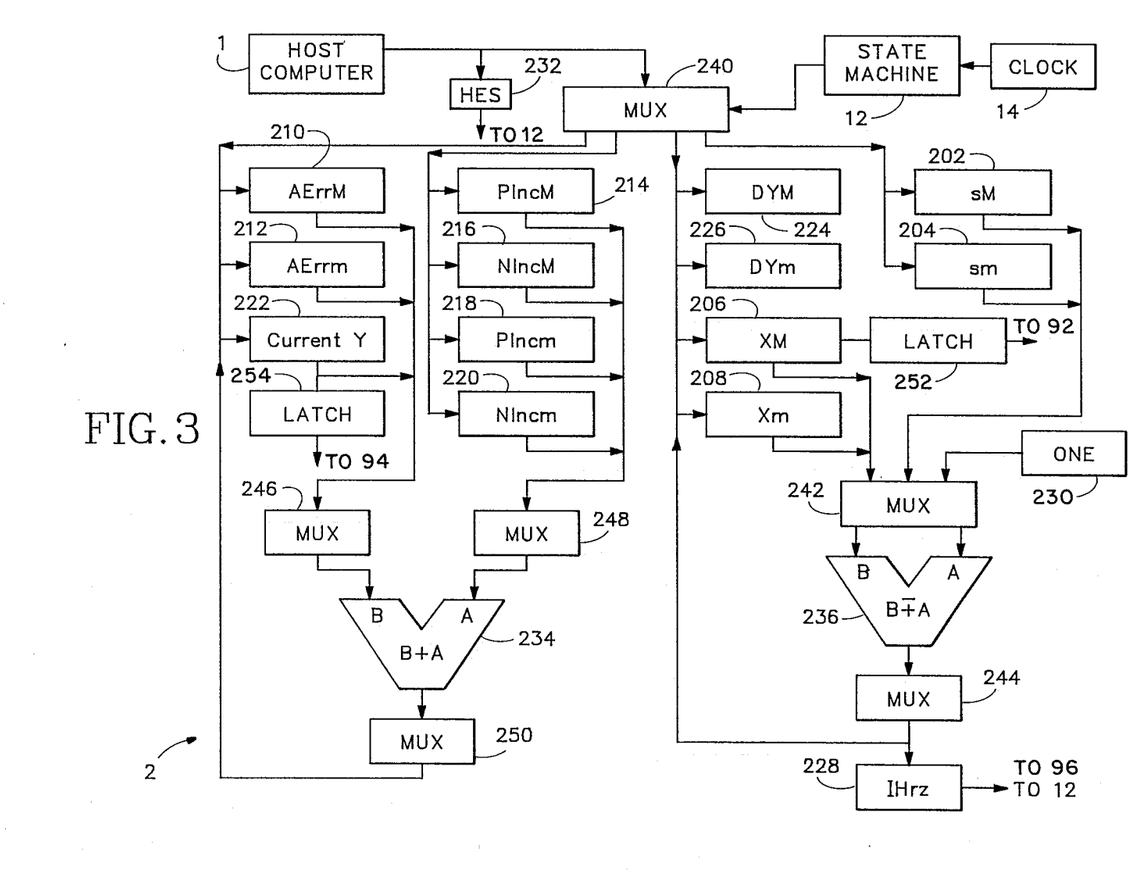
FIG. 3 is a more detailed block diagram of part of the computer graphics system shown in FIG. 2.

The XY address generator is illustrated in greater detail in FIG. 3. The XY address generator 2 comprises eleven registers 202–222, three counters 224–228, a constant value (one) 230, a one bit storage element 232, an adder 234 and a subtractor 236. The counters 224–228 and the registers 202–222 are initialized with values applied by the processor 1 through a multiplexer 240.

In order to initialize the XY address generator, the processor 1 calculates the coordinates of the vertices A–G of the polygon and determines which vertices have the minimum and maximum Y coordinate values $Y_{min}$ and $Y_{max}$, and which vertices lie along the two sidings that join these points. The processor also calculates the cross product of the two edges that extend upwards from the grid row $Y_{min}$ and if this cross product indicates that the major siding is to the right of the minor siding the processor places a logical 1 in the storage element 232.

The X coordinates of the points A and B are subtracted to yield a value DXM and the Y coordinates of the points A and B are subtracted to yield a vague DYM. Similarly, from the X and Y coordinates of the points A and G, values of DXm and DYm are calculated The processor loads the values DYM and DYm into the counters 224 and 226. The values of (DX/DY) for the major and minor edges AB and AG are calculated and the values of floor (DX/DY) for the major and minor edges are calculated. (The floor operator applied to a number returns the greatest integer not exceeding the number. Thus, floor 1.2=1, floor 2.0=2 and floor $-1.2=-2$.) The resulting values sM and sm are loaded into the registers 202 and 204. The registers 206 and 208 receive the X coordinates $XM_0$ and $Xm_0$ of the grid points at which the major and minor edges intersect the lowest grid row $Y_{min}$. In the case of the polygon shown in FIG. 4, the values for $XM_0$ and $Xm_0$ are each the X coordinate of the point A. However, the invention is not limited to the case in which the major and minor sidings meet at a vertex at either the bottom grid row or the top grid row. The registers 202, 204, 206 and 208 and the constant 230 are connected through a multiplexer 242 to the subtractor 236. The output of the subtractor 236 is applied to a multiplexer 244 having outputs connected to the registers 206 and 208 and to the counter 228.

The values of s, DX and DY for the major and minor edges AB and AG are further used by the processor to calculate values of $AErr_0$, PInc and NInc, such that $$PInc = AErr_0 = DX - sDY - DY$$

$$NInc = DX - sDY$$

These values are loaded into the registers 210–220. The register 222 is loaded with $Y_{min}$ (zero in the case of FIG. 4). The registers 210, 212 and 222 are connected through a multiplexer 246 to one input of the adder 234, while the registers 214–220 are connected through a multiplexer 248 to the second input of the adder 234. The output of the adder 234 is applied to a multiplexer 250 having outputs connected to the registers 210, 212 and 222.

When the XY address generator has been initialized in this manner, the state machine places the XY address generator in its operating state in which it executes alternately a calculation routine and a count-down routine. At the start of the calculation routine, the state machine examines the sign bits for $AErrM_i$ and $AErrm_i$, where i is an integer greater than or equal to zero and represents the number of the grid row. During a first clock cycle of the calculation routine, the subtractor 236 adds sM or sM+1, depending on whether $AErrM_i<0$ or $AErrM_i>=0$, to the contents of the register 206, providing the value of $XM_{i+1}$, where $XM_{i+1}$ is the floor of the exact intersection of the major edge with the (i+1)th grid row. Concurrently, the adder 234 adds PIncM or NIncM, depending on whether $AErrM_i<0$ or $AErrM_i>=0$, to the contents of the register 210, providing the value of $AErrM_{i+1}$. The count DYM in the counter 224 is decremented During the second clock cycle, the corresponding operations are carried out using $AErrm_i$, sm, PIncm and NIncm, providing the values of $Xm_{i+1}$ and $AErrm_{i+1}$, and the count DYm is decremented. During the third clock cycle, the value stored in the register 222 is incremented by the adder 234, returning the value i+1, and concurrently $XM_{i+1}$ is subtracted from $Xm_{i+1}$ by the subtractor 236 and the difference $Hrz_{i+1}$ is loaded into the counter 228. The value $Hrz_{i+1}$ is either the number of grid points between the major and minor edges on the (i+1)th row of grid points, or the complement of that number, depending on whether $XM_{i+1}$ is less than or greater than $Xm_{i+1}$. The values stored in the registers 206 and 222 are loaded into latches 252 and 254. The calculation routine is then complete, and the XY address generator 2 issues an address cycle to the frame buffer 9. In this address cycle, the values in the latches 252 and 254, which represent the coordinates ($XM_{i+1}$, i+1) of the floor of the exact intersection of the major siding ABCD with the (i+1)th grid row, are applied to the local display bus as bits 0–11 and 12–23, the contents of the storage element 232 determine the state of bit 27 (the hesitate bit), and the state of the sign bit of the counter 228 determines the state of bit 26 (the direction bit). The state machine then causes the XY address generator to execute the count-down routine.

During the count-down routine, the count stored in the counter 228 is incremented or decremented on each clock cycle, and the XY address generator issues a data cycle each time the count is incremented or decremented The data value placed on the local display bus during a data cycle may be determined by an intensity (I) generator 8.

The frame buffer 9 interprets an address cycle as indicating that tiling of a new row is about to start, and the values of $XM_{i+1}$ and i+1 are loaded into the address counter 92 and the Y address counter 94. The value of bit 27, reflecting the state of the storage element 232, is applied to the state machine. Bit 26 is loaded into the storage element 96. If bit 26 is set it indicates that tiling is to take place from right to left ($XM_{i+1}$ greater than $Xm_{i+1}$) and the counter 92 is decremented on each data cycle; otherwise is is incremented on each data cycle. The value of the hesitate bit (bit 27) determines whether the counter 92 is incremented (decremented) before the data value received during the first data cycle is written into the memory 90. If bit 27 is not set, when a data cycle is received by the frame buffer 9 the value stored in the X address counter 92 is incremented (decremented) and the data value provided on that data cycle is written to the location designated by the new address; otherwise, when the first data cycle is received by the frame buffer the value stored in the X address counter 92 remains unchanged and the data value is written to the location designated by the original address; and on the next and each succeeding data cycle the X address is incremented (decremented) and the data value is written to the location designated by the new address. In the case of the polygon shown in FIG. 4, bit 27 is not set, the number $Hrz_{i+1}$ is the number of grid points to be tiled in row $i+1$, and tiling is to take place from left to right. On each clock cycle, the count stored in the counter 228 is decremented.

If bit 27 had been set, indicating that $XM_{i+1}$ was to the right of $Xm_{i+1}$, the number $Hrz_{i+1}$ would be the complement of the number of grid points to be tiled and tiling would take place from right to left. On each clock cycle the count stored in the counter 228 is incremented.

When the counter 228 indicates a borrow when counting down or a carry out when counting up, the value stored in the counter 92 is equal to $Xm_{i+1}$. When the count stored in the counter 228 has reached zero counting down or $-1$ counting up, tiling of row $(i+1)$ has been completed, and in each case, the grid points from one plus the floor of the exact intersection of the left siding with row $(i+1)$ to the floor of the exact intersection of the right siding with that row, inclusive, have been tiled. The XY address generator then executes the calculation routine again, returning $XM_{i+2}$ and $Hrz_{i+2}$, and the value stored in the counter 222 is incremented.

The contents of the registers DYM and DYm are decremented on the first and second clock cycles respectively of each iteration of the calculation routine. When the contents of a register DYM or DYm reach 0, a vertex has been reached and new values of DY, PInc, NInc and $AErr_0$ are initialized for the next edge on the same siding. The XY address generator then steps to the next row. The XY address generator then executes another sequence of calculation routines and countdown routines in alternating sequence. Ultimately, using the values stored in the registers for row $Y_{max-1}$, the XY address generator generates values of XM and Hrz for the row $Y_{max}$. The value XM is the X coordinate of the vertex D, since the vertex D is at a grid point and the floor of an integer is the integer itself, and the value Hrz is zero because the two sidings meet at a vertex on row $Y_{max}$. If the polygon had had an edge on the row $Y_{max}$, the value of Hrz for that row would not have been zero.

This sequence of operations may be continued indefinitely as long as the sequence of end points for the edges in each register set is monotonically non-decreasing and no edges cross.

It will be noted that no value of Hrz is calculated for $i=0$, and consequently the bottom grid row of the polygon is not tiled. However, the top row is tiled. Similarly, the grid point at the floor of the exact intersection of a grid row with the right siding (AGFED in the case of FIG. 4) is tiled but that at the floor of the exact intersection of the grid row with the left siding is not tiled. Accordingly, when polygons abut, e.g. in a tessellation, a grid point at the boundary between two adjacent polygons is treated as being in one, and only one, polygon.

Figure 5:
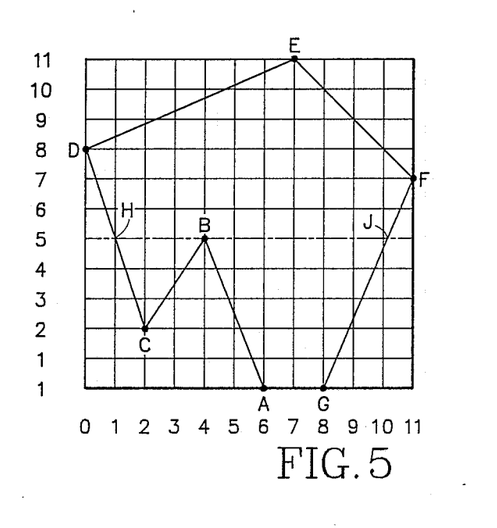
FIG. 5 illustrates a further polygon in similar fashion to FIG. 4.

A polygon with more than two active edges on a scan line may be tiled by replicating the complete XY generator or by adding sets of registers and counters and time sharing the adder and subtractor. For example, in order to tile the polygon ABCDEFG shown in FIG. 5, a first XY generator is used to tile the partial polygon ABJG. When the first XY generator reaches the row containing the point C, a second XY generator starts to tile the polygon CHB while the first XY generator continues to tile the polygon ABJG. On reaching the row containing the point B, the values of AErr, NInc and PInc used by the first and second XY address generators for the edges CH and GF are used by the first XY address generator to continue tiling of the polygon HDEFJ in the manner described with reference to FIG. 4.

The XY address generator 2 may be used in conjunction with a depth (Z) generator and an intensity (I) generator of the kind described in copending patent application Ser. No. 07/113,045 filed Oct. 26, 1987, the contents of which are hereby incorporated by reference herein.

It will be appreciated that the present invention is not restricted to the particular embodiment that has been described and illustrated, and that variations may be made therein without departing from the scope of the invention as defined in the appended claims and equivalents thereof. In particular, the invention is not limited to the vertices of the polygon being at integer points of the grid. The vertices may be at any rational points.

We claim:

1. A computer graphics system comprising:
   (a) a display device having a display surface,
   (b) display address means for generating a display address signal having an X component and a Y component such as to define a set of grid points on the display surface in a rectangular array at a pitch dX in the X direction and a pitch dY in the Y direction,
   (c) an electronic memory device having an equivalent set of addressable memory locations corresponding respectively to the grid points,
   (d) an XY address generator for automatically generating addresses of memory locations corresponding to grid points within a first selected area of the display surface and subsequently generating addresses of memory locations corresponding to grid points within a second selected area of the display surface, the second selected area and the first selected area being contiguous, and the XY address generator being such that it generates the address of each memory location in the first and second selected areas only once, and
   (e) loading means for calculating a value for a parameter Q for each of the memory locations whose addresses were generated in step (d) and loading the calculated values into the respective memory locations.

2. A method of tiling a computer graphics system that comprises a display device having a display surface, display address means for generating a display address signal having an X component and a Y component such as to define a set of grid points on the display surface in a rectangular array at a pitch dX in the X direction and a pitch dY in the Y direction, and an electronic memory device having an equivalent set of addressable memory locations corresponding respectively to the grid points, said method comprising:
- (a) generating the address of each memory location corresponding to a grid point within a first selected area of the display surface, without generating the address of any memory location corresponding to a grid point outside the first selected area,
- (b) calculating a value for a parameter Q for each memory location having an address generated in step (a),
- (c) loading the values calculated in step (b) into the respective memory locations, and
- (d) generating the address of each memory location corresponding to a grid point within a second selected area of the display surface, contiguous with the first selected area, without generating the address of any memory location corresponding to a grid point within the first selected area.

3. A method according to claim 2, further comprising:
- (e) calculating a value for the parameter Q for each memory location having an address generated in step (d), and
- (f) loading the values calculated in step (e) into the respective memory locations.

4. A method according to claim 2, wherein the first and second selected areas are each substantially triangular and meet at a side that extends transverse to the X direction substantially along a line from a location (P*dX, Q*dY) to a location ((P+p)*dX, (Q+q*dY)), where P, Q, p and q are integers, the addresses generated in step (a) include the addresses of memory locations corresponding to at least one grid point of which the Y coordinate is given by $(Q+i)*dY$, where i is an integer in the range from 1 to q, and the X coordinate is given by floor of the X coordinate of the exact intersection of a line $Y=(q/p)*X+(Q*p-q*P)*dY/p$ with the line $Y=(Q+i)*dY$, and the addresses generated in step (d) include the addresses of memory locations corresponding to at least one grid point of which the Y coordinate is given by $(Q+i)*dY$ and the X coordinate is dX plus the floor of the X coordinate of the exact intersection of the line $Y=(q/p)*X+(Q*p-q*P)*dY/p$ with the line $Y=(Q+i)*dY$.

5. A computer graphics system comprising:
- (a) a display device having a display surface,
- (b) display address means for generating a display address signal having an X component and a Y component such as to define a set of grid points on the display surface in a rectangular array at a pitch dX in the X direction and a pitch dY in the Y direction,
- (c) an electronic memory device having an equivalent set of addressable memory locations corresponding respectively to the grid points,
- (d) an XY address generator for automatically generating addresses of memory locations corresponding to grid points lying substantially on a line from a location $(X_0+e*dX, Y_0+f*dY)$ to a location $(X_0+p*dX, Y_0+q*dY)$, where $(X_0, Y_0)$ is a grid point and e, f, p, and q are rational numbers, by performing the following operations:

(i) set s = floor((p − e)/(q − f))
PInc = (p − e) − s(q − f) − (q − f)
NInc = (p − e) − s(q − f)
$AErr_0$ = PInc and (ii) for each value of i in the range from 0 to q−1, execute If $AErr_i >= 0$
then $X_{i+1}$ := $X_i$ + (s + 1)dX
$AErr_{i+1}$ := $AErr_i$ + PInc
else $X_{i+1}$ := $X_i$ + sdX
$AErr_{i+1}$ := $AErr_i$ + NInc
end If
$Y_{i+1}$ := $Y_i$ + dY and

- (e) loading means for calculating a value for a parameter Q at the memory location $(X_{i+1}+u*dX, Y_{i+1})$, where u is an integer, for each value of i in the range from 0 to q−1, and loading the calculated value of the parameter Q into the memory location.

6. A computer graphics system according to claim 5, wherein e and f are each zero, p and q are integers, and u is an integer selected from one and zero, and the loading means calculate values of Q for the memory location $(X_{i+1}+u*dX, Y_{i+1})$ and an adjacent memory location $(x_{i+1}+u*dX+v*dX, Y_{i+1})$, where v is an integer selected from one and minus one, for at least one value of i in the range from 0 to q−1, and successively load the respective memory locations.

7. A computer graphics system comprising:
- (a) a display device having a display surface,
- (b) display address means for generating a display address signal having an X component and a Y component such as to define a set of grid points on the display surface in a rectangular array at a pitch dX in the X direction and a pitch dY in the Y direction,
- (c) an electronic memory device having an equivalent set of addressable memory locations corresponding respectively to the grid points,
- (d) an XY address generator for automatically generating addresses of memory locations corresponding to grid points between a straight line from a location $(XM_0+eM*dX, Y_0+f*dY)$ to a location $(XM_0+pM*dX, Y_0+q*dY)$ and a straight line from a location $(Xm_0+em*dX, Y_0+f*dY)$ to a location $(Xm_0+pm*dx, Y_0+q*dY)$ where $(XM_0, Y_0)$ and $(Xm_0, Y_0)$ are grid points and eM, em, f, pM, pm, and q are rational numbers, by performing the following operations:

(i) set sM = floor((pM − eM)/(q − f))
PIncM = (pM − eM) − sM(q − f) − (q − f)
NIncM = (pM − eM) − sM(q − f)
$AErrM_0$ = PIncM
sm = floor ((pM − em)/(q − f))
PIncm = (pm − em) − sm(q − f) − (q − f)
NIncm = (pm − em) − sm(q − f)
$AEerrm_0$ = PIncm and (ii) for each line value of i in the range from 0 to q−1, execute

```
If AErrM_i >= 0
  then XM_{i+1}: = XM_i + sM + 1
       AErrM_{i+1}: = AErrM_i + PIncM
  else XM_{i+1}: = XM_i + sM
       AErrM_{i+1}: = AErrM_i + NIncM
end If
If AErrm_i >= 0
  then Xm_{i+1}: = Xm_i + sm + 1
       AErrm_{i+1}: = AErrm_i + PIncm
  else Xm_{i+1}: = Xm_i + sm
       AErrm_{i+1}: = AErrm_i + NIncm
end If
Y_{i+1}: = Y_i + dy
Hrz_{i+1} = Xm_{i+1} - XM_{i+1}
``` and (e) loading means for calculating a value for a parameter Q at the memory location $(XM_{i+1}+u*dX, Y_{i+1})$, where u is an integer, and at $Hrz_{i+1}$ adjacent memory locations that are on the (i+1)th row and are successively closer to the location $(Xm_{i+1}, Y_{i+1})$ and for successively loading the calculated values of Q into those memory locations.

8. A computer graphics system according to claim 7, wherein eM, em and f are each zero, pM, pm and q are integers, and u is an integer selected from one and zero, and the XY address generator performs the following additional operations:

(iii) for each value of i, execute

```
If Xm_{i+1} > XM_{i+1}
  then HES = 0
  else HES = 1
end If
```

(iv) store $XM_{i+1}$, $Y_{i+1}$, $Hrz_{i+1}$ and HES, and
(v) if HES=1, set u=1 and otherwise set u=0,
and the loading means successively load the memory locations from $(XM_{i+1}+dX, Y_{i+1})$ to $(Xm_{i+1}, Y_{i+1})$ if u=1, and otherwise successively load the memory locations from $(XM_{i+1}, Y_{i+1})$ to $(Xm_{i+1}+dX, Y_{i+1})$.

9. A computer graphics system comprising:
(a) a display device having a display surface,
(b) display address means for generating a display address signal having an X component and a Y component such as to define a set of grid points on the display surface in a rectangular array at a pitch dX in the X direction and a pitch dY in the Y direction,
(c) an electronic memory device having an equivalent set of addressable memory locations corresponding respectively to the grid points, and
(d) an XY address generator for automatically generating addresses of memory locations corresponding to grid points lying substantially on a line from a location $(X_0+e*dX, Y_0+f*dY)$ to a location $(X_0+p*dX, Y_0+dY)$, where $(X_0, Y_0)$ is a grid point and e, f, p, and q are rational numbers, by performing the following operations:

```
(i) set s = floor ((p - e)/(q - f))
    PInc = (p - e) - s(q - f) - (q - f)
    Ninc = (p - e) - s(q - f)
    AErr_0 = PInc
``` and (ii) for each value of i in the range from 0 to q−1, execute

```
If AErr_i >= 0
  then X_{i+1}: = X_i + (s + 1)dX
       AErr_{i+1}: = AErr_i + PInc
  else X_{i+1}: = X_i + sdx
       AErr_{i+1}: = AErr_i + NInc
end If
Y_{i+1}: = Y_i + dY,
``` and (e) loading means for calculating a value of a parameter Q for the memory location $(X_{i+1}+u*dX, Y_{i+1})$, where u is an integer, for each value of i in the range from 0 to q−1, and loading the memory locations $(X_{i+1}+u*dX, Y_{i+1})$ with the respective calculated values of Q.

10. A computer graphics system according to claim 9, wherein e and f are each zero, p and q are integers, and u is an integer selected from one and zero, and the loading means calculate the value of Q for the memory location $(X_{i+1}+u*dX, Y_{i+1})$ and an adjacent memory location $(X_{i+1}+u*dX+v*dX, Y_{i+1})$, where v is an integer selected from one and minus one, and successively load the calculated values of Q into the respective memory locations.

11. A computer graphics system comprising:
(a) a display device having a display surface,
(b) display address means for generating a display address signal having an X component and a Y component such as to define a set of grid points on the display surface in a rectangular array at a pitch dX in the X direction and a pitch dY in the Y direction,
(c) an electronic memory device having an equivalent set of addressable memory locations corresponding respectively to the grid points,
(d) an XY address generator for automatically generating addresses of memory locations corresponding to substantially all grid points between a straight line from a location $(XM_0+eM*dX, Y_0+f*dY)$ to a location $(XM_0+pM*dX, Y_0+q*dY)$ and a straight line from a location $(Xm_0+em*dX, Y_0+f*dY)$ to a location $(XM_0+pm*dx, Y_0+q*dY)$ where $(XM_0, Y_0)$ and $(XM_0, Y_0)$ are grid points and eM, em, f, pM, pm, and q are rational numbers, by performing the following operation:

```
(i) set sm = floor((pM - eM)/(q - f))
    PIncM = (pM - eM) - sM(q - f) - (q - f)
    NIncM = (pM - eM) - sM(q - f)
    AErrM_0 = PIncM
    sm = floor ((pm - em)/q - f))
    PIncm = (pm - em) - sm(q - f) - (q - f)
    NIncm = (pm - em) - sm(q - f)
    AErrm_0 = PIncm
``` and (ii) for each value of i in the range from 0 to q−1, execute

```
If AErrM_i >= 0
  then XM_{i+1}= XM_i + sM + 1
       AErrM_{i+1}: = AErrM_i + PIncM
  else XM_{i+1}: = XM_i + sM
       AErrM_{i+1}: = AErrM_i + NIncM
```

-continued

```
      end If
      If AErrm_i >= 0
      then Xm_{i+1} := Xm_i + sm + 1
           AErrm_{i+1} := AErrm_i + PIncm
      else Xm_{i+1}L = Xm_i + sm
           AErrm_{i+1} = AErrm_i + NIncm
      end If
      Y_{i+1} := Y_i + dy
      Hrz_{i+1} = Xm_{i+1} - XM_{i+1},
``` and (e) loading means for calculating values of a parameter Q for the memory location $(XM_{i+1}+u*dX, Y_{i+1})$, where u is an integer, and $Hrz_{i+1}$ adjacent memory locations on the (i+1)th row that are between the location $(XM_{i+1}+u*dX, Y_{i+1})$ and the location $(Xm_{i+1}+DIR*dX, Y_{i+1})$, where DIR is equal to $Hrz_{i+1}/abs. Hrz_{i+1}$, and loading the calculated values of Q into the respective memory locations, starting with the location $(XM_{i+1}+u*dX, Y_{i+1})$ and successively loading locations closer to the location $(Xm_{i+1}+DIR*dX, Y_{i+1})$.

12. A computer graphics system according to claim 11 wherein eM, em, and f are each zero, pM, pm and q are integers, and u is an integer selected from one and zero, and the XY address generator performs the following additional operations:

(iii) for each value of i, execute

```
      If Xm_{i+1} > XM_{i+1}
      then HES = 0
      else HES = 1
      end If
```

(iv) store $XM_{i+1}$, $Y_{i+1}$, $Hrz_{i+1}$ and HES, and
(v) if HES=1, set u=1 and otherwise set u=0
and the loading means successively loads the memory locations from $(XM_{i+1}+dX, Y_{i+1})$ to $(Xm_{i+1}, Y_{i+1})$ if u=1, and otherwise successively loads the memory locations from $(XM_{i+1}, Y_{i+1})$ to $(Xm_{i+1}+dX, Y_{i+1})$.

* * * * *